US011893523B2

(12) United States Patent
Bollapragada et al.

(10) Patent No.: US 11,893,523 B2
(45) Date of Patent: Feb. 6, 2024

(54) METHODS AND SYSTEMS FOR GENERATING HOLISTIC AIRLINE SCHEDULE RECOVERY SOLUTIONS ACCOUNTING FOR OPERATIONS, CREW, AND PASSENGERS

(71) Applicant: GE AVIATION SYSTEMS LLC, Grand Rapids, MI (US)

(72) Inventors: Srinivas Bollapragada, Niskayuna, NY (US); Nitish Umang, Clifton Park, NY (US); Sanket Bhat, Bengaluru (IN); Hocine Bouarab, Romsey (GB); Marc A. Garbiras, Clifton Park, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 15 days.

(21) Appl. No.: 17/153,497

(22) Filed: Jan. 20, 2021

(65) Prior Publication Data
US 2022/0230108 A1    Jul. 21, 2022

(51) Int. Cl.
*G06Q 10/0631*    (2023.01)
*G08G 5/00*    (2006.01)

(52) U.S. Cl.
CPC . *G06Q 10/06312* (2013.01); *G06Q 10/06315* (2013.01); *G08G 5/0095* (2013.01)

(58) Field of Classification Search
None
See application file for complete search history.

(56) References Cited

U.S. PATENT DOCUMENTS 6,253,147 B1    6/2001  Greenstein
6,314,361 B1 *  11/2001  Yu .................... G06Q 10/047
                                                703/22

(Continued)

FOREIGN PATENT DOCUMENTS

EP    3093806 A1    11/2016

OTHER PUBLICATIONS

A stochastic model of airline operations Rosenberger, Jay M; Schaefer, Andrew J; Goldsman, David; Johnson, Ellis L; et al. Transportation Science36.4: 357. Institute for Operations Research and the Management Sciences. (Year: 2002).*

(Continued)

*Primary Examiner* — Folashade Anderson
(74) *Attorney, Agent, or Firm* — Dinsmore & Shohl LLP

(57) ABSTRACT

Methods and systems for generating a recovery scheduling solution in response to a scheduling disruption are disclosed. A method includes receiving a request to modify an original schedule operations solution based on disruptive events, computing a flight recovery solution to reschedule disrupted flights, generating a crew recovery solution using the flight recovery solution that includes covered and uncovered flights by assigning flight crews to rescheduled disrupted flights, iteratively generating recommendations to delay or cancel uncovered flights until a best recovery solution is obtained, the best recovery solution including a crew recovery solution with a least amount of uncovered flights, iteratively generating, by the processing device, subsequent flight and crew recovery solutions based on the recommendations, generating a passenger recovery solution based on the best recovery solution and re-assigning disrupted passengers to the rescheduled disrupted flights, and configuring the airline recovery scheduling solution.

11 Claims, 6 Drawing Sheets

(56) References Cited

U.S. PATENT DOCUMENTS

| | | | |
|---|---|---|---|
| 6,408,276 B1* | 6/2002 | Yu | G06Q 10/063116 |
| | | | 701/400 |
| 6,651,046 B1 | 11/2003 | Sato et al. | |
| 7,191,140 B2 | 3/2007 | Yu et al. | |
| 8,073,726 B1 | 12/2011 | Liu et al. | |
| 8,645,177 B2 | 2/2014 | Pachon et al. | |
| 8,798,899 B2 | 8/2014 | Aragones et al. | |
| 8,825,360 B2 | 9/2014 | Johnson et al. | |
| 9,008,892 B2 | 4/2015 | Bollapragada et al. | |
| 9,165,471 B1 | 10/2015 | Chen et al. | |
| 9,378,471 B2 | 6/2016 | Pachon et al. | |
| D810,095 S | 2/2018 | Vali et al. | |
| 9,984,580 B2 | 5/2018 | Liao et al. | |
| 10,395,197 B1* | 8/2019 | Salam | G06Q 10/06314 |
| 2002/0186656 A1* | 12/2002 | Vu | H04L 49/1576 |
| | | | 370/413 |
| 2003/0191678 A1* | 10/2003 | Shetty | G06Q 10/06375 |
| | | | 705/7.24 |
| 2005/0071206 A1* | 3/2005 | Berge | G06Q 10/025 |
| | | | 705/6 |
| 2005/0165628 A1* | 7/2005 | Vaaben | G06Q 10/06 |
| | | | 705/13 |
| 2008/0215407 A1 | 9/2008 | Pachon et al. | |
| 2008/0215408 A1* | 9/2008 | Pachon | G06Q 10/06312 |
| | | | 705/7.22 |
| 2009/0288091 A1 | 11/2009 | Papadakos | |
| 2010/0082394 A1 | 4/2010 | Pachon et al. | |
| 2014/0277921 A1 | 9/2014 | Gujjar et al. | |
| 2014/0279802 A1 | 9/2014 | Harrington et al. | |
| 2014/0281712 A1 | 9/2014 | Subbu et al. | |
| 2015/0019065 A1* | 1/2015 | Bollapragada | G07C 5/006 |
| | | | 701/29.1 |
| 2015/0149234 A1 | 5/2015 | Rasheed et al. | |
| 2015/0221225 A1* | 8/2015 | Petersen | G08G 5/0043 |
| | | | 701/120 |
| 2016/0189066 A1 | 6/2016 | Liao et al. | |
| 2016/0189080 A1 | 6/2016 | Liao et al. | |
| 2016/0335567 A1* | 11/2016 | Petersen | G06Q 50/30 |
| 2017/0011326 A1* | 1/2017 | Liao | G06Q 10/063 |
| 2017/0233105 A1 | 8/2017 | Vali et al. | |
| 2017/0323231 A1 | 11/2017 | Johnson et al. | |
| 2017/0323240 A1 | 11/2017 | Johnson et al. | |
| 2018/0012152 A1 | 1/2018 | Arguello et al. | |
| 2018/0158154 A1 | 6/2018 | Arguello et al. | |
| 2018/0261102 A1 | 9/2018 | Neagu Tchamkerten et al. | |
| 2019/0057327 A1 | 2/2019 | Arguello et al. | |
| 2019/0080618 A1* | 3/2019 | Small | G08G 5/0043 |
| 2022/0230108 A1* | 7/2022 | Bollapragada | G06Q 50/14 |

OTHER PUBLICATIONS

A Proactive Crew Recovery Decision Support Tool for Commercial Airlines during Irregular Operations Abdelghany, Ahmed; Ekollu, Goutham; Narasimhan, Ram; Abdelghany, Khaled. Annals of Operations Research127.1-4: 309-331. Springer Nature B.V. (Year: 2004).*
International Search Report and Written Opinion for application PCT/US2022/012810 dated Mar. 16, 2022 (15 pages).

* cited by examiner

METHODS AND SYSTEMS FOR GENERATING HOLISTIC AIRLINE SCHEDULE RECOVERY SOLUTIONS ACCOUNTING FOR OPERATIONS, CREW, AND PASSENGERS

TECHNICAL FIELD

The present specification generally relates to methods and systems for generating airline recovery schedule solutions and, more specifically, methods and systems for generating airline recovery schedule solutions that are feasible and reduce costs to recovery from a disruptive event.

BACKGROUND

In general, airlines face disruptions to their regular scheduling operations daily due to many reasons, such as aircraft maintenance issues, inclement weather, air traffic congestion, and/or security reasons. Upon an occurrence of one or more disruptions, an airline's flight schedule for the day and beyond can become disrupted.

Methods and systems for providing an airline recovery scheduling solution that reduces airline cost and improves crew and passenger satisfaction would benefit airlines and passengers alike when such disruptions occur.

SUMMARY

In a first aspect, a method for generating an airline recovery scheduling solution in response to an airline scheduling disruption includes receiving, by a processing device, an airline recovery scheduling solution request to modify an original airline schedule operations solution based on one or more disruptive events associated with one or more airline flights, wherein the one or more disruptive events causes the airline scheduling disruption, computing, by the processing device, a flight recovery solution, based on the one or more disruptive events, to reschedule one or more disrupted flights, generating, by the processing device, a crew recovery solution using the flight recovery solution by assigning one or more flight crews to one or more rescheduled disrupted flights, wherein the crew recovery solution includes one or more covered flights and one or more uncovered flights, iteratively generating, by the processing device, one or more recommendations to delay or cancel the one or more uncovered flights until a best recovery solution is obtained during an iteration period, wherein the best recovery solution includes a crew recovery solution with a least amount of uncovered flights over the iteration period, iteratively generating, by the processing device, one or more subsequent flight recovery solutions and one or more subsequent crew recovery solutions based on the one or more recommendations to delay or cancel the one or more uncovered flights in order to solve for the best recovery solution, generating, by the processing device, a passenger recovery solution based on the best recovery solution and re-assigning one or more disrupted passengers to the one or more rescheduled disrupted flights, and configuring, by the processing device, the airline recovery scheduling solution using the best recovery solution, the flight recovery solution, and the passenger recovery solution in order to determine and transmit the airline recovery scheduling solution to one or more airports with the one or more disrupted flights.

In a second aspect, a disruption management module includes a flight recovery module configured to receive a request for an airline recovery scheduling solution from an airline scheduling system and compute a flight recovery solution based on one or more disruptive events and reschedule one or more disrupted flights. The disruption management module further includes a crew recovery module in communication with the flight recovery module, the crew recovery module configured to receive the flight recovery solution to solve for a crew recovery solution by assigning one or more crews to one or more rescheduled disrupted flight, the crew recovery solution including one or more covered flights and one or more uncovered flights. The disruption management module further includes an uncovered flights adjustment module in communication with the crew recovery module and configured to receive the crew recovery solution, wherein the uncovered flights adjustment module iteratively generates one or more recommendations to delay or cancel the one or more uncovered flight until a best recovery solution is obtained during an iteration period, wherein the best recovery solution includes a crew recovery solution with a least amount of uncovered flights over the iteration period, wherein the flight recovery module and the crew recovery module iteratively generate one or more subsequent flight recovery solutions and one or more subsequent crew recovery solutions based on the recommendation to delay or cancel the one or more uncovered flights in order to solve for the best recovery solution. The disruption management module further includes a passenger recovery module in communication with the crew recovery module to receive the best recovery solution to generate a passenger recovery solution and re-assign one or more disrupted passengers to the one or more rescheduled disrupted flights of the best recovery solution in order to configure the airline recovery scheduling solution and transmit the airline recovery scheduling solution to one or more airports with the one or more disrupted flights.

In a third aspect, an airline operations system includes an airline scheduling module configured to compute and transmit an airline schedule operations solution to at least one airport having an aircraft to follow a flight plan associated with the airline schedule operations solution and request an airline recovery scheduling solution upon a detection of one or more disruptions to one or more airline flights. The airline operations system further includes a disruption management module in communication with the airline scheduling module to receive the request for the airline recovery schedule solution, the disruption management module configured to compute the airline recovery scheduling solution using a recovery solution formulated based on one or more iteratively generated flight recovery solutions and one or more sequentially generated crew recovery solutions, wherein the one or more iteratively generated flight recovery solutions is configured using one or more iteratively generated recommendations to delay or cancel one or more uncovered flights of one or more crew recovery solutions in order to solve for a best recovery solution, and wherein the disruption management module is further configured to transmit the airline recovery scheduling solution to the airline scheduling module.

Additional features and advantages of the aspects described herein will be set forth in the detailed description, which follows, and in part will be readily apparent to those skilled in the art from that description or recognized by practicing the embodiments described herein, including the detailed description, which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
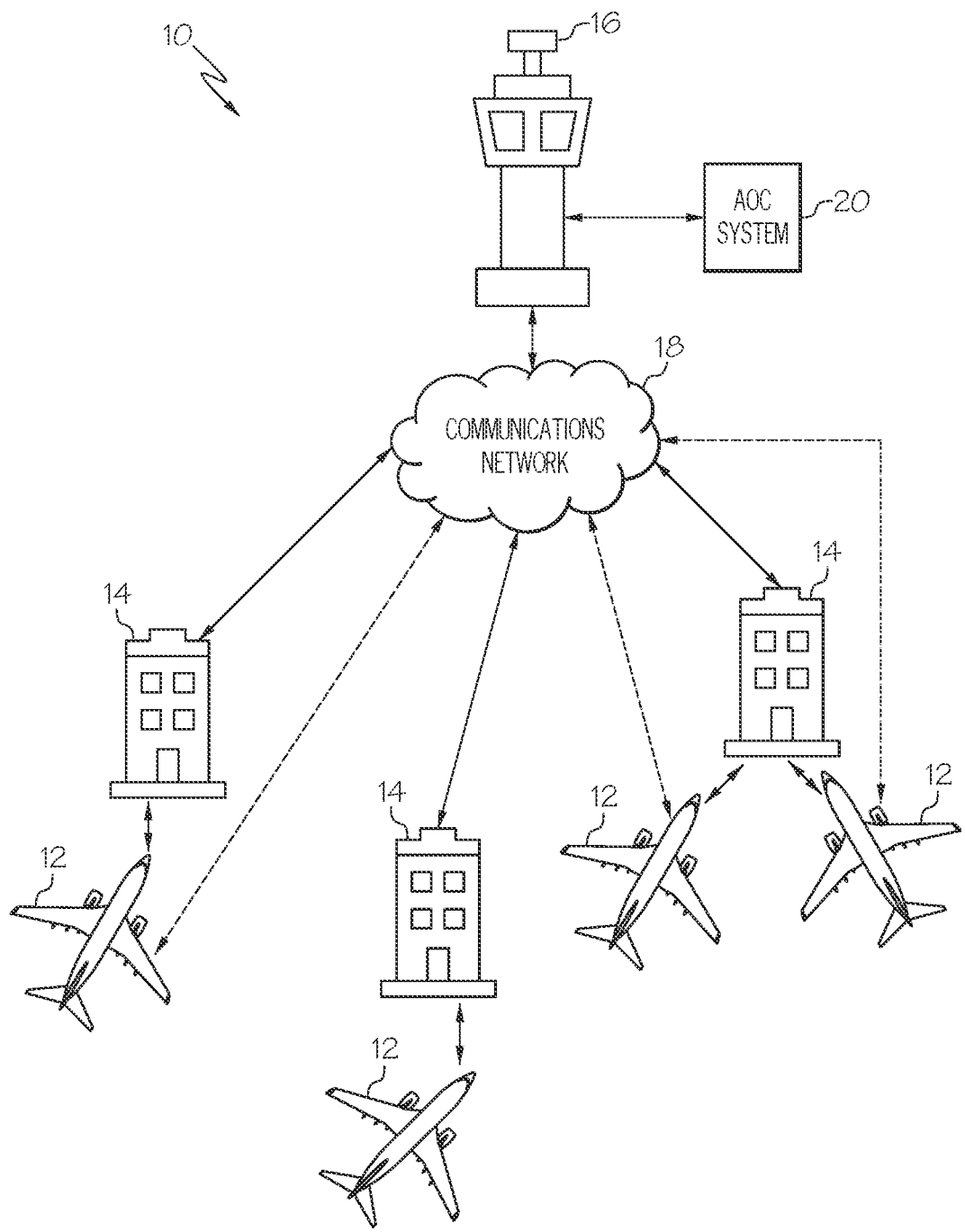
FIG. 1 schematically depicts an illustrative airline operations system of an airline operations control center organization (AOCC) that can practice one or more embodiments shown and described herein and is in communication with one or more airports to reschedule one or more disrupted flights during one or more disruptive events.

The present disclosure relates to methods and systems for generating airline recovery scheduling solutions. The methods and systems enable commercial airlines to generate an optimal airline recovery scheduling solution based on iteratively searching for an optimal or best flight and crew recovery solution found over a period of time.

When an airline disruption occurs, airline-scheduling personnel must devise a new schedule that meets constraints imposed by the disruption, a process known as schedule recovery. The airline schedulers provide a flight operations recovery schedule by rerouting aircrafts, delaying and canceling flights, re-assigning crews to flights, and rerouting passengers. Additionally, it requires multiple iterations to obtain a flight operations recovery schedule before being implemented by the airlines. The process for developing a flight operations recovery schedule is currently developed manually. Additionally, this manual process is time consuming and cumbersome, and may not represent the most efficient, cost effective, passenger-friendly, and/or crew-friendly means of rescheduling flights. It should be appreciated that this manual process also results in sub-optimal airline operations and significantly increases the cost of operating airlines, which are frequently pressured to find new ways to cut costs.

For example, in the United States, national airspace congestion is responsible for over 50% of the schedule disruptions. Aircraft subsystem failures resulting in unplanned maintenance and other airline related issues account for over 40% of the disruptions. Inclement weather and security-related issues account for the rest of the disruptions. Most disruptions are known with little lead time resulting in flight delays, cancellations, ferried aircraft, along with crew and passenger misconnections. A crew misconnection occurs when there is a break in one or more connections for original crew pairings or crew duty periods. A passenger misconnection occurs when there is a break in one or more connections of a passenger's original flight schedule or itinerary.

The various embodiments described herein may provide benefits to airline operation systems by generating an airline recovery scheduling solution based on selecting and rescheduling one or more flights with a minimal number of breaks in original crew pairings and a minimal number of breaks in original passenger connections. Rescheduling flights that cause a minimal number of breaks in original crew pairings and a minimal number of breaks in original passenger connections reduces airline costs. One reason for this reduced cost is that mending or creating new crew pairings is often difficult to repair once a crew pairing is broken and expensive because breaking a crew pairing may cause one or more crew misconnections for the reminder of the journey.

Another benefit may include generating a faster and more accurate airline recovery scheduling solution because the embodiments disclosed herein limit a number of iterations to search for a best version of an airline scheduling recovery solution based on a least number of flight cancellations and a least amount of delays for each delayed flight. Still another benefit may include providing a passenger recovery solution that ensures that passengers are not delayed more than necessary in making their connecting flights, which in turn is a cost benefit because passengers are not missing as many connecting flights and needing to be rerouted to different flights. One more benefit to implementing one or more of the embodiments disclosed herein includes generating a flight recovery solution and a crew recovery solution that is feasible without manual intervention.

Referring now to FIG. 1, there is shown an example-operating environment that includes an example of an airline operations system 10. In some embodiments, the airline operations system 10 includes one or more aircrafts 12, one or more airports 14, a communications network 18, and an Airline Operations Control Center (AOCC) 16 operating an AOCC system 20.

The one or more aircrafts 12 may include one or more planes that carries one or more passengers and/or goods. The one or more aircrafts 12 may be connected to the communications network 18 and in communication with the AOCC 16, via the AOCC system 20, and the one or more airports 14.

The one or more airports 14 may include one or more facilities to store and maintain one or more aircrafts 12. The one or more airports 14 may include one or more network computers (not shown). Each airport 14 may be configured to with a bilateral communications link in order to communicate with the AOCC 16, via the AOCC system 20, and the one or more aircrafts 12.

The communications network 18 may include any suitable data communication, telecommunication, wired, wireless, or other technology for facilitating communications. The communications network 18 may be used to connect any number of devices, systems, or components, including one or more networking computers are not specifically described herein. For example, the communications network 18 may use one or more of a local area network (LAN), a wide area network (WAN), a wireless local area network (WLAN), a metropolitan area network (MAN), a personal area network (PAN), a virtual private network (VPN), the internet, a cellular network, a paging network, a private branch exchange (PBX), and/or the like. Data sent via the communications network 18 may be encrypted or unencrypted.

In some embodiments, the AOCC 16 may include a command, coordination, and control center for an airline with the one or more airports 14. In one or more embodiments, the AOCC 16 may integrate one or more diverse processes relating to passenger, baggage, cargo, and aircrafts 12. In at least one embodiment, the AOCC 16 may be responsible for transmitting and communicating the airline scheduling solution to the one or more airports 14 and the one or more aircrafts 12. In other words, the AOCC 16 may be responsible for providing, transmitting and/or displaying the airline scheduling solution to personnel at the one or more airports 14, the one or more aircrafts 12 and one or more related airline entities (not shown).

In one or more embodiments, the AOCC 16 provides each aircraft 12 with a predetermined planned route to fly with one or more passengers aboard having diverse itineraries with various connecting flights to convey them from a source airport to a destination airport. Prior to an aircraft's departure, the one or more airports 14 or the one or more aircrafts 12 may experience one or more disruptive events caused by at least one or more of: aircraft maintenance issues, inclement weather, air traffic congestions, and/or security issues.

In some embodiments, the AOCC system 20 of the AOCC 16 is electronically operated and maintained by the AOCC 16 or by another entity. In one embodiment, the AOCC system 20 may monitor each of the aircraft maintenance issues, inclement weather, air traffic congestions, and or security issues by receiving updates and notifications from the one or more airports 14 and the one or more aircrafts 12. Additionally, the AOCC system 20 may monitor weather data and air traffic management data to determine or detect if the data reaches or falls below or above a predetermined threshold. In one or more embodiments, the AOCC system 20, the aircraft 12 and/or airport 14 may identify, determine and/or detect an occurrence of the one or more disruptive event that may cause a delay or cancellation by using one more networking systems (not shown) such as a maintenance system of an aircraft, weather system surrounding a nearby airport, or a problem with air traffic management data. More specifically, the AOCC system 20 may monitor the airline scheduling solution in real time to detect and/or determine whether one or more flights are on time or delayed and any related reasons and causes for any delayed or canceled flights.

Still referring to FIG. 1, in general, the AOCC system 20 may generate an airline scheduling solution and transmit and/or display the airline scheduling solution to one or more airports along with one or more aircrafts 12. In some embodiments, the AOCC system 20 may constantly and continuously monitor data and information related to each airport 14 and aircraft 12 for the one or more disruptive events and receive a signal or notification indicating the occurrence of one or more disruptive events along with descriptions to identify specifically the one or more disruptive events. In at least one embodiment, the AOCC system 20 may automatically generate an airline recovery scheduling solution in response to the one or more disruptive events.

Figure 2:
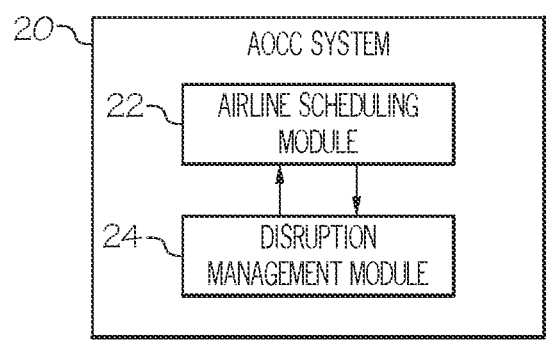
FIG. 2 depicts a block diagram of an illustrative AOCC system used by the AOCC of FIG. 1, according to one or more embodiments shown and described herein.

Referring to FIG. 2, the AOCC system 20 may include routines, programs, objects, devices, modules, components, data structures, and/or the like that have the technical effect of performing particular tasks or implementing particular data types by machine-executable instructions, such as program codes executed by machines in the communications network 18. Machine-executable instructions represent examples of codes for executing the methods disclosed herein.

As shown in FIG. 2, in some embodiments, the AOCC system 20 may include an airline scheduling module 22 communicatively coupled to a disruption management module 24. In one embodiment, the airline scheduling module 22 may develop an airline scheduling solution and continuously monitors the airline schedule operation to determine or detect the occurrence of one or more disruptions, as described in greater detail herein. In return, in some embodiments, the airline scheduling module 22 may request that the disruption management module 24 provide an airline recovery scheduling solution to compensate for the disruptions.

In some embodiments, the airline scheduling module 22 may include routines, programs, codes, instructions, objects, components, data structures, etc. perform particular tasks that can be implemented by machine-executable instructions stored in a data storage device (not shown), and executed and processed via one or more processors (not shown) and a memory component (not shown).

In some embodiments, the airline scheduling module 22 may generate the airline scheduling solution as described herein. In one or more embodiments, the airline scheduling solution may sequentially solve for three operations: the flight schedule operations, the crew schedule operations and the passenger schedule operations. During the flight schedule operations, the airline scheduling module may schedule a plurality of airline flights and assign specific aircraft for every airline flight (commonly called a tail assignment). After the flight schedule operation has been determined, the airline scheduling module 22 may transmit and/or display the flight schedule and begin the crew scheduling operations.

During the crew scheduling operations, the airline scheduling module 22 may define crew duty periods or crew pairings that will cover all of the airline flights for a specific period of time. Next, the airline scheduling module 22 may assign specific crewmembers to the crew pairings and transmit the crew scheduling operations.

In some embodiments, the airline scheduling module 22 may initiate, any time after the flight schedule is transmitted, the passenger schedule operations. In doing so, the airline scheduling module 22 may receive passenger data for specific aircrafts 12, wherein each passenger is associated with one or more purchased airline tickets for one or more seats on the airline flight and is assigned to a specific airline flight and aircraft 12 associated with the purchased airline tickets for the passenger in one or more embodiments. In one more embodiments, the airline scheduling module 22 may begin assigning passengers to the one or more aircrafts after the crew scheduling operations are complete. In some embodiments, the airline scheduling module 22 may update the passenger schedule up until passengers begin boarding onto an airline flight and transmit and/or display the passenger schedule any time before and/or during boarding.

Once the airline scheduling solution has been sent, the airline scheduling module 22 may monitor the airline scheduling solution to determine the occurrence of one or more disruptive events that may affect the airline schedule and thereby, cause flight delays and/or cancellations.

In one or more embodiments, the occurrence of one or more disruptive events may include, but is not limited to, any one or more of the following: cancelled flights, delayed arrival flights, delayed departure flights, enroot delays, crew delays, crew no shows, passenger delays, aircraft malfunctions, air traffic control, adverse weather conditions, and the like. While monitoring one or more of the disruptive events, the airline scheduling module 22 may determine or detect an occurrence of the one or more disruptive events via a notification from the one or more aircrafts 12, the one or more airports 14 or real-time monitoring of one or more parameters such as the inclement weather conditions or air traffic control or the like. In at least one embodiment, after the one or more disruption events occurs, the airline scheduling module 22 may transmit a request or signal, to the disruption management module 24, for the airline recovery scheduling solution. The airline scheduling module 22 will be discussed in further detail below.

Figure 3:
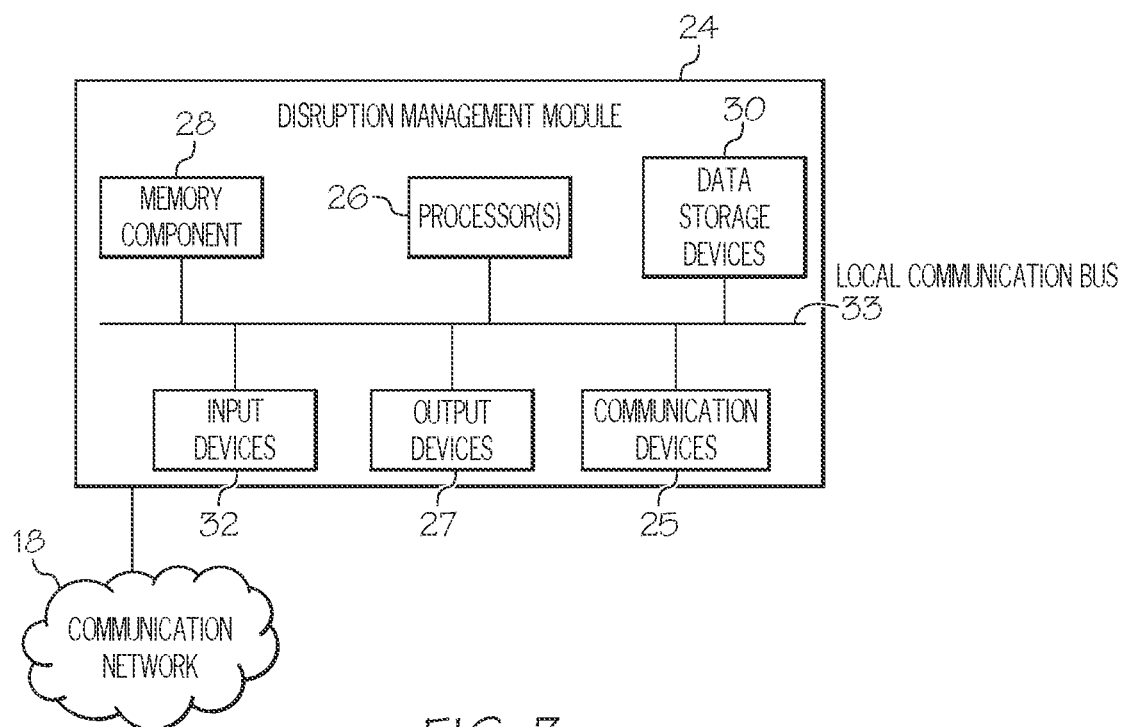
FIG. 3 depicts a block diagram of various internal hardware components of a disruption management module, according to one or more embodiments shown and described herein.

Now referring to FIG. 3, a block diagram of an example disruption management module 24 in accordance with some embodiments is provided. In one or more embodiments, the disruption management module 24 may be a computing device of the airline operations system 10 and may be in the form of electronic hardware components that may be located throughout the airline operations system 10. In some embodiments, the disruption management module 24, for example, may be associated with other devices for implementing the processes disclosed herein.

In one or more embodiments, the disruption management module 24 may include communication devices 25, a processor 26, a memory component 28, data storage devices 30, output devices 27, input devices 32, and a local communication bus 33 along with any and all of the hardware, software, and firmware associated with the AOCC system 20 or any of one or more networked computers (not shown) associated with the airline operations system 10. In one or more embodiments, the disruption management module 24 may include any and all of the hardware, software, and firmware associated with the airline scheduling system to perform any of the functionality of its application. In some embodiments, the disruption management module 24 may include routines, programs, codes, instructions, objects, components, data structures, etc. that performs particular tasks that can be implemented by machine-executable instructions stored in the data storage devices 30, and executed and processed via the processor 26 and the memory component 28.

In some embodiments, the communication devices 25 may be configured to receive and/or transmit data communications via the communications network 18 to another device or system, such as the airline scheduling module 22 (e.g. other examples include, but not limited to an administrator device or client device, not shown) and transmit information and data to the processor 26 and the memory component 28.

In some embodiments, the processor 26 may include one or more Central Processing Units (CPUs) in the form of a one-chip microprocessors or a multi-core processor. The processor 26 may be coupled to and in communication with, via the local communication bus 33, the memory component 28, the communication devices 25, the output devices 27, and the data storage devices 30. The processor 26 may perform and implement the instructions of the disruption management module to operate thereby in accordance with any of the embodiments described herein. The disruption management module 24 may be stored in a compressed, uncompiled, and/or encrypted format. Program instructions for the disruption management module 24 may include other program elements, such as an operating system, a database reporting system, and/or other device drivers used by the processor 26 to interface with, for example, a client, an airline administrator, and other devices (not shown in FIG. 3)

In some embodiments, the memory component 28 may include one or more RAM memory modules. In some embodiments, the input devices 32 may include one or more input devices 32, such as a touchscreen, a mouse, a keyboard, and/or the like. In some embodiments, the output devices 27 may include one or more output devices 27, such as a computer monitor display (e.g. LCD display), a touchscreen display, a printer, a scanner, a fax machine or the like.

In some embodiments, the data storage devices 30 may include an appropriate information storage device, including machine-readable media. In one or more embodiments, the machine-readable media may include RAM, ROM, EPROM, EEPROM, CD-ROM, or other optical disk storage, magnetic disk storage, solid state drives, semiconductor memory devices other magnetic storage devices or any other medium that can be used to carry or store desired program code in the form of machine-executable instructions or data structures and that can be accessed by a general purpose or special purpose computer or other machine with the processor 26. In one or more embodiments, when information is transferred or provided over a network or another communication connection (e.g. hardwired, wireless, or a combination of hardwired and wireless) to a machine, the machine properly views the connection as a machine-readable medium, thus, any such connection is properly termed a machine-readable medium. In one embodiment, combinations of the above are also included within the scope of machine-readable media.

In one or more embodiments, the data storage devices 30 may store program code or instructions to control an operation of the database engine to generate a flight recovery solution that is based on selecting and rescheduling one or more disrupted flights having a minimum number of breaks in the one or more original crew pairings and a minimum number of breaks in the one or more original passenger connections of an original airline scheduling solution. In some embodiments, the data storage devices 30 may include data used by the airline operations system 10, in some aspects, in performing one or more of the processes herein including individual processes, individual operations of those processes, and combinations of the individual processes, and the individual process operations.

In one or more embodiments, the data stored in the data storage devices 30 may include fight related data. In one or more embodiments, the flight related data may include but not limited airline real-time and projected traffic management information data, disrupted flight information, and the like. In some embodiments, the airline traffic management information data may include airborne air traffic, airport status, demand information for aircrafts 12 arrivals and departures, traffic management plans, airport special events, etc.

In one or more embodiments, the data stored in the data storage devices 30 may include crew related data. In some embodiments, the crew related data may include data related to one or more on-duty crews, reserved crews, standby crews, start times, stop times, crew pairings, itineraries, salaries, and the like. In one or more embodiments, the data stored in the data storage devices 30 may include passenger related data. In some embodiments, the passenger related data can include data related to one or more passengers, passenger connections, cost of passenger's flights, and passenger itineraries, and the like.

In one or more embodiments, the data stored in the data storage devices 30 may include data related to airports, airlines, route information, plane information, country codes, airline timetable or flight schedule, airfares, flight tracking data, historical data, etc.

In some embodiments, the data stored in the data storage devices 30 may further include constraints data. In one or more embodiments, the constraints data may include one or more conditions or controls that may govern, limit and/or effect how one or flights or one or more crews may be scheduled. In one or more embodiments, the constraints data may include one or more constraints related to conditions and limitations regulating to flight time, duty time and required rest for crew members, aircraft maintenance schedules, crew member qualifications, crew vacations, crew bid requests, labor agreements, airline rules (e.g. pairing experienced crew members with more junior crew members and returning crews to their base at the end of their trip) and/or the occurrence of one or more disruptive events. In one embodiment, a constraint may include a condition that each selected reserve crew must be deadhead or travel in time to meet connection time requirements. In some embodiments, a constraint may include a condition that all flights must either be delayed or cancelled. In one or more embodiments, another constraint may include a condition that each uncovered flight must be assigned a reserve crew or cancelled as in one or more embodiments.

In one or more embodiments, for example, the data may comprise a persistence layer of a data system and store one or more objectives, one or more constraints, one or more flight recovery solutions, one or more crew recovery solutions, an airline scheduling solution, and/or one or more airline recovery scheduling solutions in accordance with one or more embodiments described herein.

As disclosed herein, information may be received by or transmitted to, for example, the airline scheduling module 22 from another device, system, a software application, or module within the airline operations system 10 from another software application, module, device, system, or any other source.

Figure 4:
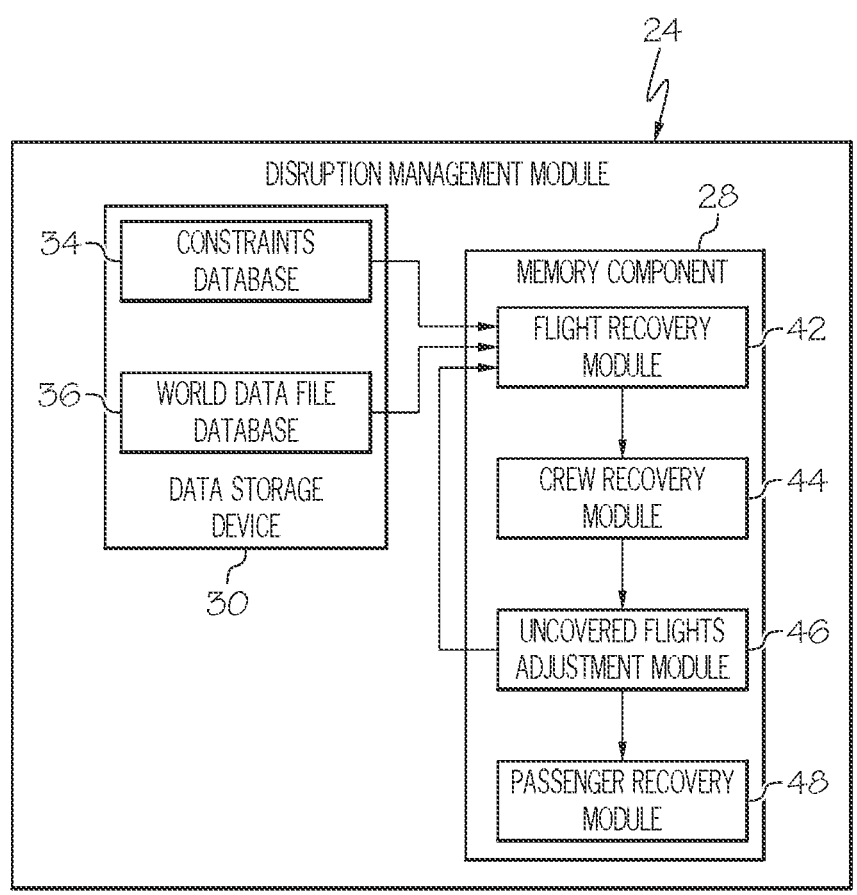
FIG. 4 illustrates a block diagram depicting an example disruption management module using one or more software module components to access and utilize one or more of the hardware components of FIG. 3, according to one or more embodiments shown and described herein.

As shown in FIG. 4, an example block diagram of the disruption management module 24 may further include one or more subroutines, databases or modules, such as a constraints database 34, a world data file database 36, a flight recovery module 42, a crew recovery module 44, an uncovered flights adjustment module 46, and a passenger recovery module 48. In one or more embodiments, the world data file database 36 and the constraints database 34 may be located and stored within the data storage devices 30. In some embodiments, the flight recovery module 42, the crew recovery module 44, the uncovered flights adjustment module 46, and the passenger recovery module 48 may be located and stored in the memory component 28.

In some embodiments, the flight recovery module 42 is communicatively coupled to the crew recovery module 44. In at least one embodiment, the crew recovery module 44 in return is communicatively coupled to the uncovered flights adjustment module 46. In some embodiments, the uncovered flights adjustment module 46 is communicatively coupled to the passenger recovery module 48 and the flight recovery module 42.

In one or more embodiments, the flight recovery module 42 may be configured to receive input from the one or more input devices 32 and/or the communication devices 25 of the disruption management module 24, via the local communication bus 33. In some embodiments, the flight recovery module 42 may utilize and include at least a portion of each of the communication devices 25, the processor 26, the memory component 28, the data storage devices 30, the input devices 32 along with any and all of electronic hardware, software, and firmware associated with and located throughout the airline operations system 10 to perform any of the functionality of its application. In some embodiments, the flight recovery module 42 may include routines, programs, codes, instructions, objects, components, data structures, etc. to perform one or more particular tasks that can be implemented by machine-executable instructions stored in the data storage devices 30, and executed and processed via the processor 26 and the memory component 28.

In some embodiments, the crew recovery module 44 may be configured to communicate with the flight recovery module 42, via the local communication bus 33. In some embodiments, the crew recovery module 44 may utilize and include at least a portion of each of the processor 26, the memory component 28, the data storage devices 30, the local communication bus 33, and the input devices 32 along with any and all of the hardware, software, and firmware associated with the airline operations system 10 to perform any of the functionality of its application. In some embodiments, the crew recovery module 44 may include routines, programs, codes, instructions, objects, components, data structures, etc. that perform particular tasks that can be implemented by a program including machine-executable instructions stored in the data storage devices 30, and executed and processed via the processor 26 and the memory component 28 via the local communication bus 33.

In one or more embodiments, the uncovered flights adjustment module 46 may be in the form electronic hardware components are located throughout the airline operations system 10. In some embodiments, the uncovered flights adjustment module 46 may utilize and include the processor 26, memory component 28, the data storage devices 30, the input devices 32 along with any and all of the hardware, software, and firmware associated with the airline operations system 10 to perform any of the functionality of its application. The uncovered flights adjustment module 46 may receive input from one or more of the input devices 32 and the communication devices 25 of the disruption management module 24. The uncovered flights adjustment module may receive flight data and crew data from the data storage devices 30. In some embodiments, the uncovered flights adjustment module may be configured to output an airline recovery scheduling request along recommending delaying or cancelling one or more uncovered flights.

In one or more embodiments, the passenger recovery module 48 may be in communication with the uncovered flights adjustment module 46. The passenger recovery module 48 may be in the form electronic hardware components are located throughout the airline operations system 10. In some embodiments, the passenger recovery module 48 may utilize and include the processor 26, the memory component 28, the data storage devices 30, the output devices 27 along with any and all of the hardware, software, and firmware associated with the airline operations system 10 to perform any of the functionality of its application. The passenger recovery module 48 may receive data from the uncovered flights adjustment module 46, the constraints database 34, and the world data file database 36, and transmit data via the output devices 27 and the communication devices 25.

In one or more embodiments, the constraints and the world data file databases 34, 36 may each include a relational database, a multi-dimensional database, an extendable Markup Language (XML) document, or any other data storage system storing structured and/or unstructured database. In one or more embodiments, the constraints and world data file databases 34, 36 may include a distributed database system having data distributed among several relational databases, multi-dimensional databases and/or other data sources, an object oriented database, a hybrid database, and other types of database management systems including an in-memory database system that can be provided in a "cloud." In one or more embodiments, the constraints and world data file databases 34, 36 may be stored in the data storage devices 30. In one or more embodiments, the world data file databases 36 may include the flight related data, the crew related data, and the passenger related data. In some embodiments, the constraints database 34 may include the constraints related data.

Figure 5:
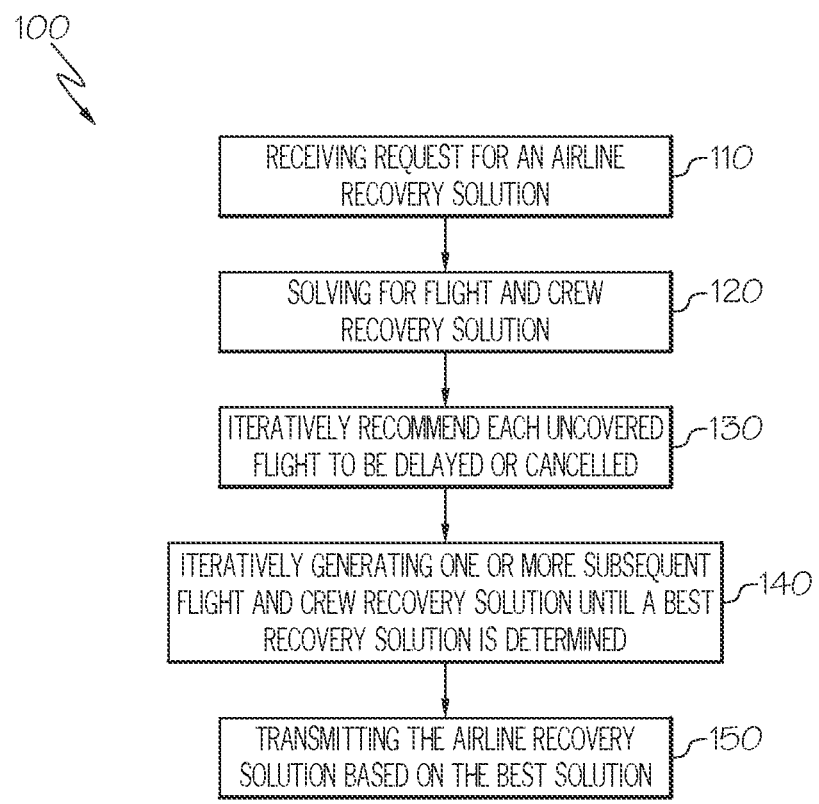
FIG. 5 depicts a flow chart of an illustrative method of optimally rescheduling airline flights caused by one or more disruptive events, according to one or more embodiments shown and described herein.

Now referring to FIG. 5, an example flowchart illustrating an example method 100 of the example system for generating an airline recovery scheduling solution using the example disruption management module 24 is shown. At block 110, the disruption management module 24 may be configured to receive a request for an airline recovery solution via the communication devices 25 from the airline scheduling module 22. The airline scheduling module 22 may continuously monitor the airline schedule for any kind of disturbances that may affect an original airline schedule. Once one or more disturbances are observed, reported or detected by one or more airports 14, one or more aircrafts 12, or the airline scheduling module 22, the airline scheduling module 22 may transmit the request for an airline recovery scheduling solution to the disruption management module 24 in order to modify the original airline scheduling solution based on an occurrence of the one or more disruptive events.

In one or more embodiments, the disruption management module 24 may receive the request for the airline recovery scheduling solution to modify the airline scheduling solution in response to an airline scheduling disruption. In doing so, in some embodiments, the disruption management module 24 may solve for the airline recovery scheduling solution by sequentially solving for a flight recovery solution, a crew recovery solution, and a passenger recovery solution. Alternatively, the disruption management module 24 may solve for the airline recovery scheduling solution by simultaneously solving for the flight recovery solution and the crew recovery solution, then solving for the passenger recovery solution.

In some embodiments, in block 120, the disruption management module may generate, using the processor 26 and the memory component 28, a flight recovery solution and a crew recovery solution based on the request for the airline recovery scheduling solution and the occurrence of the one or more disruptive events. More specifically, the disruption management module 24 may be configured to retrieve flight data from the world data file database 36 of the data storage devices 30, via the local communication bus 33, and compute, generate, and/or formulate a flight recovery solution, using the processor 26 and the memory component 28. In one or more embodiments, the flight recovery solution may include one or more rescheduled flights that were affected by the one or more disruption events in order to modify the original airline scheduling solution. In rescheduling the one or more disrupted flights, the disruption management module 24 may delay or cancel one or more of the disrupted flights.

After computing the flight recovery solution, the disruption management module 24 may sequentially generate, compute, and/or formulate a crew recovery solution, using the processor 26 and the memory component 28, based on the flight recovery solution and the crew related data stored within the data storage devices 30. The disruption management module 24 may generate, using the processor 26 and the memory component 28, the crew recovery solution by assigning one or more disrupted crews to one or more rescheduled flights. In at least one embodiment, the crew recovery solution may include covered flights and uncovered flights. In some embodiments, a covered flight may include a rescheduled flight with an assigned crew. In one or more embodiments, an uncovered flight may include a rescheduled flight without an assigned crew.

In some embodiments, at block 130, the disruption management module 24 may iteratively generates one or more recommendations for delaying or canceling uncovered flights and transmit one or more requests for subsequent airline recovery scheduling solutions along with one or more iteratively generated recommendations. More specifically, in at least one embodiment, the disruption management module 24 may receive the crew recovery solution and determine whether the crew recovery solution is feasible. In some embodiments, if the crew recovery solution contains uncovered flights, then the disruption management module 24 may determine that the crew recovery solution is not feasible because, in general, any flight without an assigned crew cannot be flown. In some embodiments, if the disruption management module 24 determines there are one or more uncovered flights, the method 100 proceeds to block 140.

At block 140, the disruption management module 24 may iteratively generate one or more subsequent flight and crew recovery solutions based on the iteratively generated recommendations and determine a best recovery solution for the airline recovery scheduling solution. The best recovery solution may include a crew recovery solution along with a corresponding flight recovery solution having rescheduled flights with the least amount of delays for one or more delayed flights and the least amount of flight cancellations over an iteration period. The iteration period may include a predetermined start time for the beginning of an optimization process until a predetermined end time for ending the optimization process has been reached or a maximum iteration value has been reached. The disruption management module 24 may continue to search for the best recovery solution, using the processor 26 and the memory component 28, by iteratively generating recommendations and the one or more subsequent flight and crew recovery solutions in a closed loop until the crew recovery solution includes only covered flights and/or an iteration threshold is reached. Using the best recovery solution, the disruption management module 24 may generate a passenger recovery solution based on the best recovery solution such that the disruption management module 24 may assign one or more disrupted passengers to the one or more covered flights. After generating the passenger recovery solution, the disruption management module 24 may formulate the airline recovery scheduling solution using the best recovery solution and the passenger recovery solution and proceed to block 150.

At block 150, the disruption management module 24 may transmit the airline recovery scheduling solution to the airline scheduling module 22, one or more airports 14 and/or one or more aircrafts 12.

Figure 6:
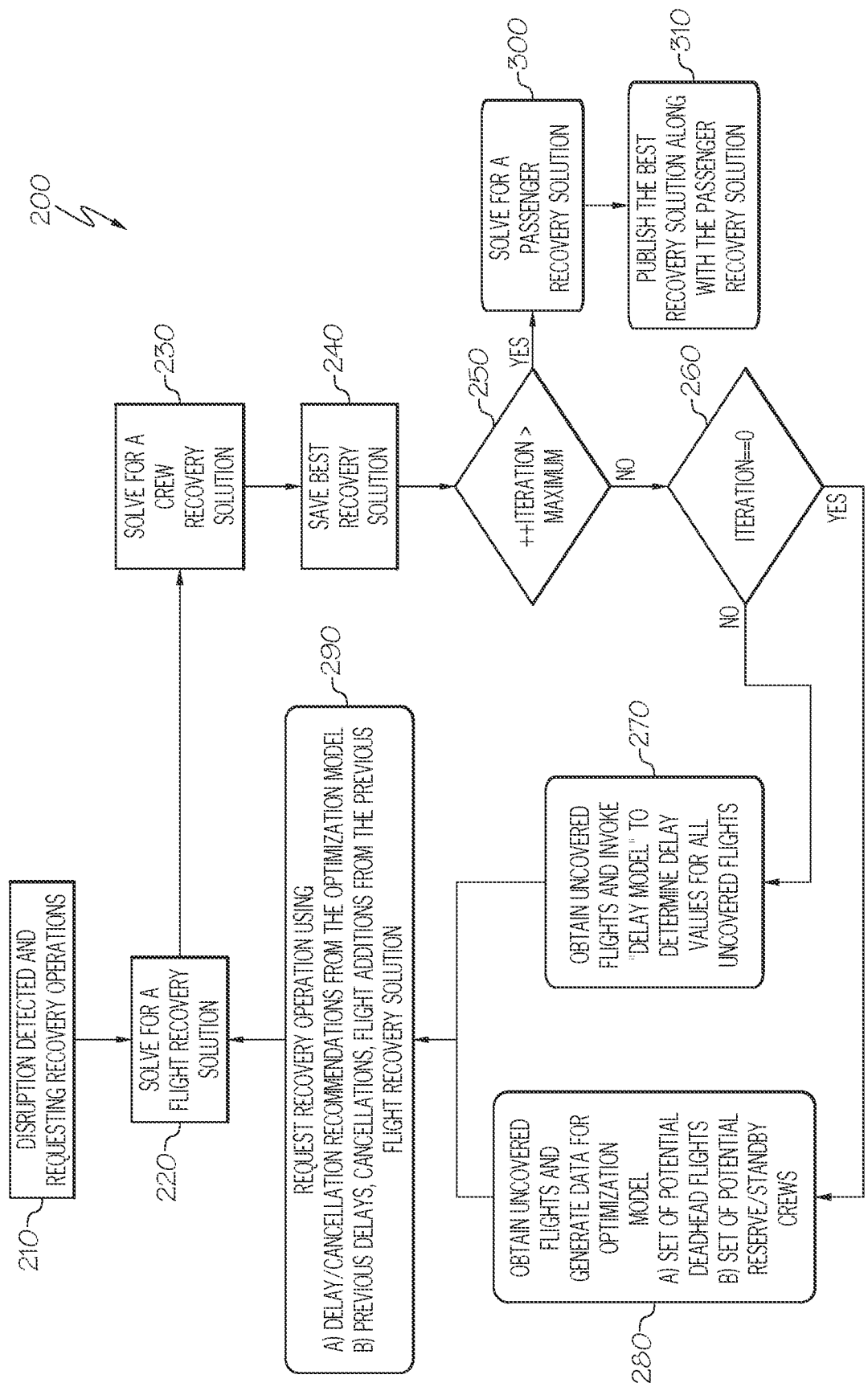
FIG. 6 depicts an illustrative logical block diagram implementing a method of optimally rescheduling one or more airline flights caused by one or more disruptive events according to one or more embodiments shown and described herein.

Now referring to FIG. 6, a flowchart is provided in order to provide a more detailed discussion of the one or more embodiments of a method 200 using the airline operations system 10. At block 210, in one embodiment, upon indication of the occurrence of the one or more disruption events, the airline scheduling module 22 may transmit the request for the airline recovery scheduling solution to the flight recovery module 42. The airline scheduling module 22 may transmit the request for the airline recovery scheduling solution based on a notification from the one or more aircrafts 12, the one or more airports 14, and/or a real-time detection of one or more delayed or cancelled flights indicating the occurrence of the one or more disruption events.

At block 220, the flight recovery module 42 may be configured to receive one or more requests, via the communication devices 25, for an airline recovery scheduling solution to modify an original airline operations scheduling solution to meet new constraints imposed by the occurrence of one or more disruptions. Once the request is received, the flight recovery module 42 electronically retrieves and, using the processor 26 and the memory component 28, reads flight data and non-fly crew data of the world data file database 36, via the local communication bus 33. In doing so, in some embodiments, the flight recovery module 42 may delay one or more previously scheduled flights and determine a delay amount associated with one or more delayed flights. In one embodiment, the flight recovery module 42 may determine whether one or more of the disrupted flights may be canceled, and if necessary, cancel one or more of the disrupted flights. In at least one embodiment, the flight recovery module 42 may swap any aircraft 12 with another aircraft 12. In one embodiment, the flight recovery module 42 may determine whether one or more ferries may be used. In some embodiments, the flight recovery module 42 may add one or more flights to the flight recovery solution. In other words, based on the flight data, the constraints and any objective functions, the flight recovery module 42 may reschedule one or more disrupted flights by delaying, cancelling, swapping, and or ferrying the one or more disrupted flights.

In one or more embodiments, using the data for flight delays, flight cancellations, aircraft swaps, ferries and the constraints, the flight recovery module 42 may also configure one or more cost of alternative solutions for delaying or canceling the one or more disrupted flights. In one embodiment, the costs may include flight costs and crew costs. In some embodiments, the flight costs may include airport cost of approach and taxing, service costs, an average maintenance costs for a type of aircraft, fuel cost, etc. In one or more embodiments, the crew costs may include an average or real salary cost of select crews, hotel costs, and extra-crew travel costs. Knowing each of the above-mentioned costs allows the flight recovery module to select the most cost efficient and productive flight recovery solution that provides for the most efficient use of resources in order to recover from the one or more disruptions to the original airline scheduling solution. One of the goals of an airline is to run a cost efficient model. Thus, in general, the most cost effective model may be selected as the flight recovery solution.

Using the flight data, cost data, and the constraints data, the flight recovery module 42 generates, compiles, and formulates, using the processor 26 and the memory component 28, the flight recovery solution having one or more rescheduled flights that were affected by the one or more disruptive events. For example, the flight recovery solution may include one or more flight delays, one or more flight cancellations, one or more added flights, and one or more swapped flights. After solving for the flight recovery solution at block 220, the flight recovery module 42 may transmit, using the processor 26 and the memory component 28, a request for a crew recovery solution along with the flight recovery solution, via the local communication bus 33, to the crew recovery module 44 at block 230.

At block 230, the crew recovery module 44 may receive, using the processor 26 and the memory component 28, the request for the crew recovery solution and the flight recovery solution, via the local communication bus 33, then solve, using the processor 26 and the memory component 28, for the crew recovery solution based on the flight recovery solution. The crew recovery solution may be solved by re-assigning one or more disrupted flight crews to one or more rescheduled flights, and transmitting, using the processor 26 and the memory component 28, the crew recovery solution to the uncovered flights adjustment module 46, via the local communication bus 33 and the method 200 proceeds to block 240.

At block 240, the uncovered flights adjustment module 46 may save the flight and crew recovery solutions as a best recovery solution in some embodiments. In one or more embodiments, the uncovered flights adjustment module 46 may optimize and/or improve the flight recovery solution by iteratively searching for one or more flight and crew recovery solutions to identify the best recovery solution over an iteration period until the iteration maximum value is reached. The iteration period may include a period of time from which the iteration value is incremented from 0 to 1, the start of the optimization process, until either the iteration value is reset to 0 or the iteration value exceeds the maximum iteration value, the end of the optimization process. In one embodiment, the best recovery solution may include a saved crew recovery solution having a greatest number of covered flights, a least amount of flight delays, a lowest number of cancellations and no uncovered flights. In some embodiments, the uncovered flights adjustment module 46 may compare a saved best recovery solution to a subsequent crew recovery solution to determine whether the subsequent crew recovery solution includes less delay amounts for delayed flights, fewer flight cancellations than the saved crew recovery solution, and no uncovered flights.

Upon receipt of the crew recovery solution, the uncovered flights adjustment module 46 compares, using the processor 26 and the memory component 28, the crew recovery solution to the saved best recovery solution. The best recovery solution may include a combined recovery solution having previously determined flight and crew solutions produced and saved during a same iteration count. If there is no previously saved crew recovery solution, the uncovered flights adjustment module 46 may save received flight and crew recovery solutions as the best recovery solution and determines whether an iteration value has reached the maximum iteration amount.

Once the best recovery solution has been saved at block 250, the uncovered flights adjustment module may determine whether the iteration value has reached it maximum at block 250 in some embodiments. If no, then the method 200 proceeds to block 260. If yes, then method 200 proceeds to block 300.

At block 260, the uncovered flights adjustment module 46 iteratively searches for the best recovery solution by determining whether the iteration value is equal to 0 or a predetermined number. If no, then proceed to block 270. If yes, then proceed to block 280. In one or more embodiments, in order to search for the best recovery solution, the uncovered flights adjustment module 46 determines whether to invoke a delay model at block 270 or an optimization model at block 280. In some embodiments, if the iteration value is not equal to 0, the uncovered flights adjustment module 46 may invoke the delay model and proceed to block 270. In one or more embodiments, the delay model may include identifying and obtaining all uncovered flights in the crew recovery solution, incrementing a delay value for all of the uncovered flights and formulating a recommendation based on the delayed model for each all of the uncovered flights.

In some embodiments, if the iteration value equals to 0, the uncovered flights adjustment module 46 may invoke the optimization model and proceed to block 280. In at least one embodiment, at block 280, the optimization model may include identifying and obtaining one or more uncovered flights in the crew recovery solution, generating a set of potential deadhead flights, generating a set of reserve/standby crews that can be assigned to the one or more uncovered flights with or without deadheading to an origin station of the one or more uncovered flights and formulating a recommendation for each of the one or more uncovered flights whether to delay or cancel each of one or more uncovered flights. A crewmember may be deadheading if a crewmember is flying in a passenger seat and not working as part of an assigned crew for a specific flight, such that the crewmember is being reposition by the airline as part of the workday. A cost of deadheading may include a cost associated with having the crewmember assigned to a flight as a passenger instead of being a working member of the flight.

In some embodiments, the uncovered flights adjustment module 46 may include an optimizing model component for modeling one or more scenarios for delaying uncovered rescheduled flights with the reserved crew and/or the standby crew. In one embodiment, the optimizing model component may use one or more algorithms to process an incoming flight and crew recovery solutions to generate, calculate, and determine whether to cancel or delay one or more uncovered flights. The one or more algorithms may include using a mathematical program or simulation, such as an orchestration math program, where the particular optimization algorithm executed by the uncovered flights adjustment module may depend on a user specific selection or preference, a complexity of the optimization being performed or a combination thereof. In one or more embodiments, the orchestration programming solver may determine whether a delay or cancellation is needed for each of the uncovered flights. In one embodiment, in providing a recommendation to modify a flight recovery solution for the uncovered flights, orchestration math program solver may minimize a cost collection of delay cost, cancellations costs, deadheading costs.

In some embodiments, using data for uncovered flights, reserve and standby crews, and one or more scheduled flights to deadhead one or more reserve and standby crews, the orchestration math program solver may compute the recommendation for each of the uncovered flights that includes an optimal delay or cancellation configuration that will allow the subsequent flight recovery solution to include a maximum number of rescheduled flights with assigned crews using the reserve and/or standby crews. In at least one embodiment, for each recommended delayed flight, the uncovered flights adjustment module 46 may also determine a delay amount associated with each delayed flight.

At block 290, the uncovered flights adjustment module 46 may formulate a recommendation based on the delayed model for all of the uncovered flights and transmits the recommendation along with a request, using the processor 26 and the memory component 28, for an airline recovery scheduling solution to the flight recovery module 42. Along with the recommendation, the uncovered flights adjustment module 46 may produce a request for a subsequent airline recovery scheduling solution with delayed and/or cancelled flight recommendations to be transmitted to the flight recovery module 42.

Using the request and recommendations, the flight recovery module 42 starts to repeat and proceed to block 220 using the request and the recommendations to produce a subsequent or second flight recovery solution and transits the subsequent or second flight recovery solution to the crew recovery module 44. Again, at block 240, the crew recovery module 44, in turn, solves and transmits a subsequent or second crew recovery solution.

In some embodiments, the uncovered flights adjustment module 46, the flight recovery module 42, and the crew recovery module 44 may be configured in a closed loop feedback system until the maximum iteration value is reached; the output of the uncovered flights adjustment module 46 is an input to the flight recovery module 42; in turn, the output of the flight recovery module 42 is an input to the crew recovery module 44; and the output of the crew recovery module 44 is an input to the uncovered flights adjustment module 46. The output of the uncovered flights adjustment module 46 provides feedback into the flight recovery module 42 and the flight recovery module 42 may re-determine the flight recovery solution or a subsequent flight recovery solution using the recommendation to delay or cancel any uncovered flight rescheduled based on a previous flight recovery solution. Likewise, output of the flight recovery module 42 is an input into the crew recovery module 44 and is used to produce a subsequent crew recovery solution. The output of the flight recovery module 42 is once again inputted into the uncovered flights adjustment module 46 until the maximum threshold has been reached. Once the maximum threshold is reached, the uncovered flights adjustment module 46 transmits the best recovery solution wherein the best recovery solution includes a crew recovery solution generated, calculated or determined to have a least amount of cancellation flights and a least amount of delay for one or more covered delayed flights based on the minimized cost of a collection of costs over the period of time.

At block 300, in some embodiments, the passenger recovery module 48 may receive the best recovery solution and assign one or more disrupted passengers previously scheduled on one or more covered flights and solve for the passenger recovery solution. At block 310, the passenger recovery module 48 may publish the airline recovery scheduling solution. More specifically, the passenger recovery module 48 may generate, store, and transmit the airline recovery scheduling solution based the best recovery solution and the passenger recovery solution to other devices (such as a display), the one or more airports 14, one or more aircrafts 12, and/or one or more systems (e.g. a database management system, the airline scheduling module 22).

While the above-mentioned examples use reserved/standby crews to determine recommendations for uncovered rescheduled flight delays/cancellations, in some embodiments, the uncovered flights adjustment module 46 may provide recommendations using all disrupted crews in determining whether to assign a crew to an uncovered flight if a specific crew could rerouted to cover the uncovered flights in time.

Figure 7:
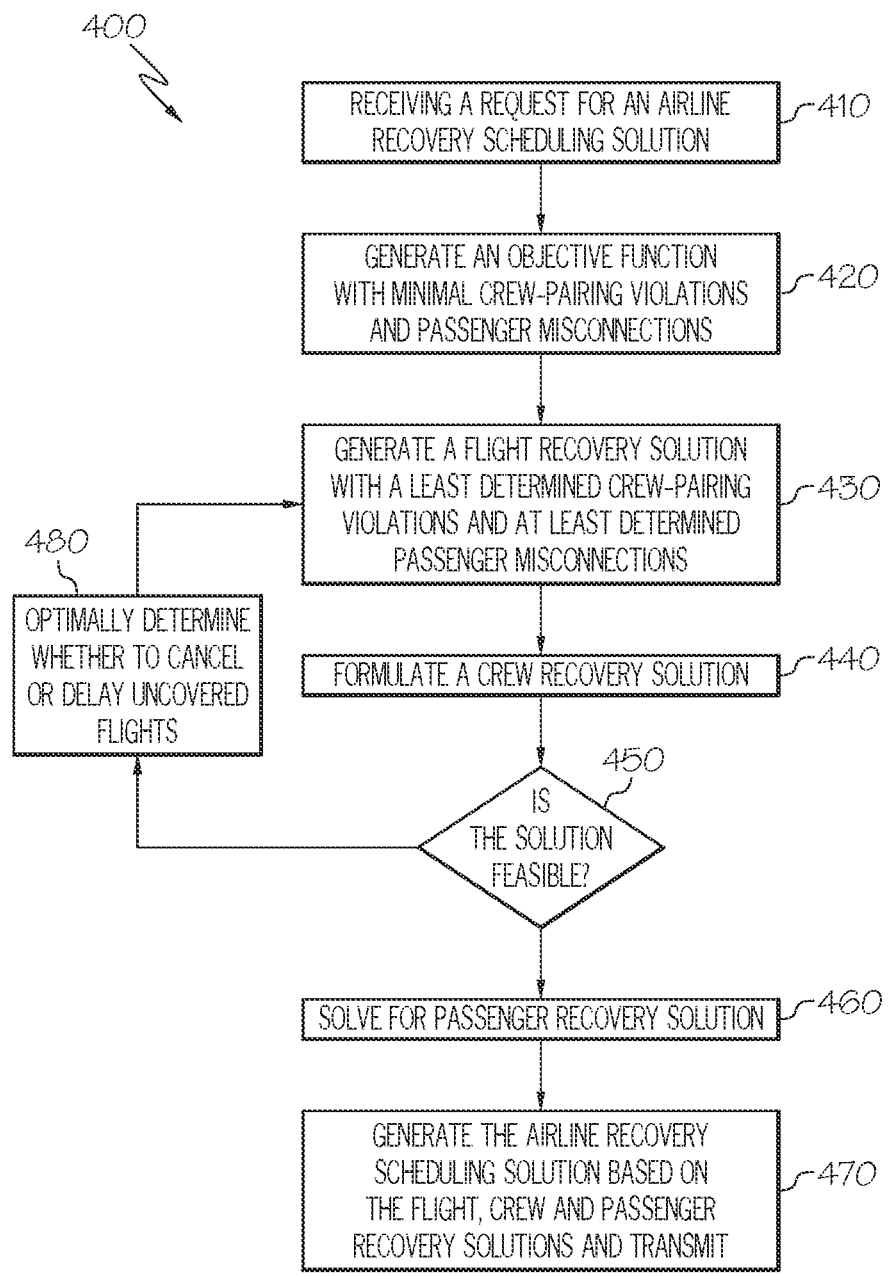
FIG. 7 depicts an illustrative logical block diagram implementing a method of rescheduling airline flights caused by one or more disruptive events, according to one or more embodiments shown and described herein.

Referring to FIG. 7, an example flow chart of a method 400 using the airline operations system 10 is now discussed. At block 410, the flight recovery module 42 receives, using the processor 26 and the memory component 28, a request for an airline recovery flight solution needed to modify an original airline schedule to meet new constraints imposed by one or more disruptions from an airline scheduling module. In one or more embodiments, an originally scheduled crew pairing may include one or more crew duty periods or crew pairings that were originally scheduled to cover all of the airline flights for a specific period of time prior to the occurrence to the one or more disruptive events. A passenger connection may include a start or origin connection of passenger flight or itinerary may and one or more connecting flight segments to reach a destination. A passenger misconnection may include one or more breaks in the passenger's original flight itinerary or one or more connecting flights.

At block 420, the flight recovery module 42 generates a crew and passenger friendly objective function that penalizes delayed flights that breaks one or more original crew-pairings and one or more original passenger connections associated with the original airline scheduling solution. A user (e.g. administrator) or another entity (e.g. airline) may input the objective function may in order to preset one or more objective values. In one or more embodiments, the crew friendly objective may consider one or more costs including flight delay costs, flight cancellation costs, and ferry aircraft costs. A ferry aircraft is an aircraft that needs to be moved without passengers from one airport 14 to another airport 14 in order to satisfy a flight recovery solution. Thus, ferry aircraft costs relate to costs associated with flying the one or more aircrafts 12 from one airport 14 to another airport 14 without passengers in order to satisfy the flight recovery solution.

In some embodiments, the flight recovery module 42 may generate one or more flight recovery scenarios to determine a crew and passenger friendly flight recovery solution for the airline recovery scheduling solution by generating a flight recovery solution that is focused on minimizing a number of breaks in original or existing crew pairings and a number of breaks in original or existing passenger connections. In some embodiments, a crew-friendly flight recovery solution may include a flight recovery solution with the least amount of breaks in an original crew pairing of the original airline scheduling solution prior to the one or more disruptions. In one or more embodiments, a passenger-friendly flight recovery solution may include a flight recovery solution having a least possible number of breaks in original passenger connections of the original airline scheduling solution prior to the one or more disruptions.

In one or more embodiments, the flight recovery module 42 may include a crew and passenger program modeling component (not shown) in order to generate the one or more flight scenarios. In one embodiment, the crew and passenger friendly program modeling component may include computing the flight recovery solution based on the minimal amount of breaks in original crew pairings and the minimal amount of breaks in original passenger connections of the original airline scheduling solution. More specifically, in one or more embodiments, the crew and passenger friendly program modeling component may include a mathematical optimization model. In some embodiments, the mathematical optimization model may be formulated using a network flow math program, such as a mixed integer linear program solver. In some embodiments, the mixed integer linear program solver may include an objective function and one or more constraints to solve for the flight recovery solution. In one or more embodiments, the mixed integer linear program solver may minimize a collection of costs including flight delays, flight cancellations, added flights, swapped flights, and added ferries. In some embodiments, the flight recovery module 42 may generate the objective function that penalizes flights delays, flight cancellations, tail swaps, aircraft ferries, crew-pairing violations, and/or passenger misconnections.

Additionally, the objective function may be subject to one or more of the following constraints regarding crew pairings: assigning a cost amount to each delayed flight having one or more original crew pairings breaks, assigning a cost amount to each delayed flight without breaking the one or more original crew pairings, and increasing the cost amount to each delayed flight having broken crew pairings as a number of broken crew pairings increases. The cost amount assigned to the each delayed flight without breaking crew pairings is selected to be substantially higher than the cost amount assigned to the each delayed flight with broken crew pairings in order to discourage the network math program solver from using or selecting flights that break crew pairings and promote and encourage flights that with minimal or no breaks in original crew pairings.

Likewise, the objective function may also be subject to one or more of the following constraints related to the one or more passenger misconnections: assigning a cost amount to each delayed flight having one or more passenger misconnections, assigning a cost amount to each delayed flight without having the one or more passenger connections and the cost amount for each delayed flight with one or more passenger misconnections must be greater than the cost amount for each delayed flight without the one or more passenger misconnections.

At block 430, the flight recovery module 42 formulates a flight recovery solution using the objective, the constraints, and a modeling component to simulate one or more scenarios such that the flight recovery solution is based on a scenario with a minimal cost of a collection of flight delay costs, flight cancellation costs, and ferry costs. The flight recovery module 42 may retrieve the flight data from the world data file database 36 and the constraints from the constraints database 34 in order to use in the modeling component to determine the flight recovery solution. The flight recovery solution may include one or more rescheduled delayed flights, one or more canceled flights, and one or more ferried aircrafts to transfer between locations to position one or more aircrafts 12 to be assigned for one or more scheduled flights.

In doing so, in some embodiments, the flight recovery module 42 may delay one or more previously scheduled flights and determine a delay amount associated with delayed flights. In one embodiment, the flight recovery module 42 may determine whether any one or more of the disrupted flights may be canceled, and if necessary, cancel the one or more disrupted flights. In at least one embodiment, the flight recovery module 42 may swap any aircraft with another aircraft. In one embodiment, the flight recovery module 42 may determine whether one or more ferries may be used. In some embodiments, the flight recovery module 42 may add one or more flights to the flight recovery solution. In other words, based on the flight data, the constraints and the objective function, the flight recovery module 42 may reschedule one or more disrupted flights by delaying, cancelling, swapping, and or ferrying the one or more disrupted flights.

In one or more embodiments, using the data for flight delays, flight cancellations, aircraft swaps, ferries and the constraints, the flight recovery module 42 may also configure one or more cost alternative solutions for delaying or canceling the one or more disrupted flights. In one embodiment, the costs may include flight costs and crew costs. In some embodiments, the flight costs may include airport cost of approach and taxing, service costs, an average maintenance costs for a type of aircraft, fuel cost, etc. In one or more embodiments, the crew costs may include an average or real salary cost of select crews, hotel costs, and extra-crew travel costs. Knowing each of the above mentioned costs allows the flight recovery module 42 to select the most cost efficient and productive flight recovery solution that provides for the most efficient use of resources in order to recover from the one or more disruptions to the original airline scheduling solution. One of the goals of an airline is to run a cost efficient model. Thus, in general, a most cost effective model based on selecting flights with the least amount of breaks in original crew pairings and the least amount of breaks in original passenger connections may be selected as the flight recovery solution.

After solving the flight recovery solution, the flight recovery module 42 transmits the flight recovery solution and a request for a crew recovery solution to the crew recovery module 44. At block 440, the crew recovery module 44 generates the crew recovery solution based on the flight recovery solution. More specifically, the crew recovery module 44 assigns one or more disrupted crews to the one or more reschedule flights to determine the crew recovery solution in some embodiments. In one or more embodiments, the crew recovery module 44 may assign disrupted and/or reserved airline crews to the rescheduled flights to produce a crew recovery solution. In at least one embodiment, the scheduled airline crew may include any crew directly affected by the occurrence of the one or more disruptive events.

The crew recovery solution may include covered and uncovered flights. A covered flight may include a rescheduled flight with an assigned crew. On the other hand, an uncovered flight may include a rescheduled flight without an assigned crew. The crew recovery module 44 may transmit the crew recovery solution to the uncovered flights adjustment module 46 at block 450.

At block 450, the uncovered flights adjustment module 46 receives the crew recovery solution and determines whether the crew recovery solution is feasible. If the crew recovery solution includes uncovered flights, then the uncovered flights adjustment module 46 may determine that the crew recovery solution is not feasible because a rescheduled flight without an assigned crew cannot be flown. If the crew recovery solution includes only covered flights, then the uncovered flights adjustment module 46 may determine that the crew recovery solution is feasible because all of the rescheduled flights can be flown because each flight has an assigned crew.

Thus, at block 450, a determination is made of whether the crew recovery solution is feasible. If yes, then proceed to block 460. If no, then proceed to block 480. At block 480, the uncovered flights adjustment module 46 optimally determines which uncovered flights to delay or cancel and transmits a recommendation and request to re-solve or formulate a subsequent flight recovery solution based on the recommendations and the object function. After the uncovered flights adjustment module 46 generates the recommendation, the uncovered flights adjustment module 46 transmits the recommendation and a subsequent request for the airline recovery scheduling solution and the method proceed to again to block 430 for further processing.

At block 460, the passenger recovery module 48 receives the crew recovery module 44. In return, the passenger recovery module 48 may solve and generate the passenger recovery solution by assigning disrupted passengers to the covered flights and proceed to block 470. At block 470, the passenger recovery module 48 may compile and generate the airline recovery scheduling solution based on the flight, crew and passenger recovery solutions and transmit the airline recovery scheduling solution to the one or more airports 14 and the one or more aircrafts 12.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

Further aspects of the invention are provided by the subject matter of the following clauses:

1. A method for generating an airline recovery scheduling solution in response to an airline scheduling disruption, the method comprising: receiving, by a processing device, an airline recovery scheduling solution request to modify an original airline schedule operations solution based on one or more disruptive events associated with one or more airline flights, wherein the one or more disruptive events causes the airline scheduling disruption; computing, by the processing device, a flight recovery solution, based on the one or more disruptive events, to reschedule one or more disrupted flights; generating, by the processing device, a crew recovery solution using the flight recovery solution by assigning one or more flight crews to one or more rescheduled disrupted flights, wherein the crew recovery solution includes one or more covered flights and one or more uncovered flights; iteratively generating, by the processing device, one or more recommendations to delay or cancel the one or more uncovered flights until a best recovery solution is obtained during an iteration period, wherein the best recovery solution includes a crew recovery solution with a least amount of uncovered flights over the iteration period; iteratively generating, by the processing device, one or more subsequent flight recovery solutions and one or more subsequent crew recovery solutions based on the one or more recommendations to delay or cancel the one or more uncovered flights in order to solve for the best recovery solution; generating, by the processing device, a passenger recovery solution based on the best recovery solution and re-assigning one or more disrupted passengers to the one or more rescheduled disrupted flights; and configuring, by the processing device, the airline recovery scheduling solution using the best recovery solution, the flight recovery solution, and the passenger recovery solution in order to determine and transmit the airline recovery scheduling solution to one or more airports with the one or more disrupted flights.

2. The method of any preceding clause, wherein iteratively generating, by the processing device, the one or more recommendations further comprises generating at least one or more modeling scenarios to compute the one or more recommendations to delay or cancel the one or more uncovered flights based on a minimal cost collection of flight delay costs, flight cancellation costs, and deadheading costs.

3. The method of any preceding clause, wherein iteratively generating, by the processing device, the one or more recommendations further comprises: identifying, by the processing device, all of the one or more uncovered flights of a current crew recovery solution; obtaining, by the processing device, a delay value associated with each of the one or more uncovered flights; incrementing, by the processing device, the delay value of each of the one or more uncovered flights by a predetermined increment value; and generating, by the processing device, the one or more recommendations to delay the one or more uncovered flights with an incremented delay value for each of the one or more uncovered flights along with a request for a subsequent airline recovery scheduling solution.

4. The method of any preceding clause, wherein iteratively generating, by the processing device, the one or more recommendations further comprises: identifying, by the processing device, the one or more uncovered flights of a current crew recovery solution; generating, by the processing device, a list of the one or more reserve and standby crews; assigning, by the processing device, the one or more reserve and standby crews to the one or more uncovered flights; and generating, by the processing device, the one or more recommendations to delay each of one or more previously uncovered flights assigned with the one or more reserve and standby crews along with a request for a subsequent airline recovery scheduling solution.

5. The method of any preceding clause, further comprising: generating a list of deadhead flights; determining whether each of the one or more reserve and standby crews can be assigned with deadheading to an origin station of the one or more uncovered flights; determining whether each of the one or more reserve and standby crews can be assigned without deadheading to the origin station of the one or more uncovered flights; determining if any of the one or more reserve and standby crews cannot be assigned with or without deadheading to the origin station of the one or more uncovered flights; assigning the one or more reserve and standby crews that can be assigned to the one or more uncovered flights with or without deadheading to the origin station of the one or more uncovered flights; and generating, by the processing device, the request for a subsequent airline recovery scheduling solution using the one or more recommendations to delay any of the one or more uncovered flights assigned with the one or more reserve and standby crews.

6. The method of any preceding clause, wherein generating, by the processing device, the one or more recommendations further comprises canceling at least one of the one or more uncovered flights not assigned with any of the one or more reserve and standby crews.

7. The method of any preceding clause, wherein iteratively generating the one or more recommendations further comprises generating one or more modeling scenarios to compute the one or more recommendation to delay or cancel the one or more uncovered flights based on a minimal cost collection of flight delay costs, flight cancellation costs, and deadheading costs.

8. A disruption management module comprising: a flight recovery module configured to receive a request for an airline recovery scheduling solution from an airline scheduling system and compute a flight recovery solution based on one or more disruptive events and reschedule one or more disrupted flights; a crew recovery module in communication with the flight recovery module, the crew recovery module configured to receive the flight recovery solution to solve for a crew recovery solution by assigning one or more crews to one or more rescheduled disrupted flight, the crew recovery solution including one or more covered flights and one or more uncovered flights; an uncovered flights adjustment module in communication with the crew recovery module and configured to receive the crew recovery solution, wherein the uncovered flights adjustment module iteratively generates one or more recommendations to delay or cancel the one or more uncovered flight until a best recovery solution is obtained during an iteration period, wherein the best recovery solution includes a crew recovery solution with a least amount of uncovered flights over the iteration period, wherein the flight recovery module and the crew recovery module iteratively generate one or more subsequent flight recovery solutions and one or more subsequent crew recovery solutions based on the recommendation to delay or cancel the one or more uncovered flights in order to solve for the best recovery solution; and a passenger recovery module in communication with the crew recovery module to receive the best recovery solution to generate a passenger recovery solution and re-assign one or more disrupted passengers to the one or more rescheduled disrupted flights of the best recovery solution in order to configure the airline recovery scheduling solution and transmit the airline recovery scheduling solution to one or more airports with the one or more disrupted flights.

9. The disruption management module of any preceding clause, wherein the uncovered flights adjustment module is further configured to: identify all of the one or more uncovered flights of a current crew recovery solution, obtain, by a processing device, a delay value associated with each of the one or more uncovered flights; increment the delay value of each of the one or more uncovered flights by a predetermined increment value; and generate a recommendation to delay of each of the one or more uncovered flight with an incremented delay value for each of the one or more uncovered flights along with a request for a subsequent airline recovery scheduling solution.

10. The disruption management module of any preceding clause, wherein the uncovered flights adjustment module is further configured to: identify the one or more uncovered flight of a current crew recovery solution; generate a list of the one or more reserve and standby crews; assign the one or more reserve and standby crews to the one or more uncovered flights; and generate a recommendation to delay each of one or more previously uncovered flights assigned with the one or more reserve and standby crews along with a request for a subsequent airline recovery scheduling solution.

11. The disruption management module of any preceding clause, wherein the uncovered flights adjustment module is further configured to: generate a list of deadhead flights; determine whether each of the one or more reserve and standby crews can be assigned with deadheading to an origin station of the one or more uncovered flights; determine whether each of the one or more reserve and standby crews can be assigned without deadheading to the origin station of the one or more uncovered flights; determine if any of the one or more reserve and standby crews cannot be assigned with or without deadheading to the origin station of the one or more uncovered flights; assign the one or more reserve and standby crews that can be assigned to the one or more uncovered flights with or without deadheading to the origin station of the one or more uncovered flights; and generate the request for a subsequent airline recovery scheduling solution using a recommendation to delay any of the one or more uncovered flights assigned with the one or more reserve and standby crews.

12. The disruption management module of any preceding clause, wherein the uncovered flights adjustment module is further configured to generate a recommendation to cancel any of the one or more uncovered flights not assigned with any of the one or more reserve and standby crews.

13. The disruption management module of any preceding clause, wherein the uncovered flights adjustment module is further configured to generate at least one or more modeling scenarios to compute the recommendation to delay or cancel the one or more uncovered flights based on a minimal cost collection of flight delay costs, flight cancellation costs, and deadheading costs.

14. An airline operations system comprising: an airline scheduling module configured to compute and transmit an airline schedule operations solution to at least one airport having an aircraft to follow a flight plan associated with the airline schedule operations solution and request an airline recovery scheduling solution upon a detection of one or more disruptions to one or more airline flights; and a disruption management module in communication with the airline scheduling module to receive the request for the airline recovery schedule solution, the disruption management module configured to compute the airline recovery scheduling solution using a recovery solution formulated based on one or more iteratively generated flight recovery solutions and one or more sequentially generated crew recovery solutions, wherein the one or more iteratively generated flight recovery solutions is configured using one or more iteratively generated recommendations to delay or cancel one or more uncovered flights of one or more crew recovery solutions in order to solve for a best recovery solution, and wherein the disruption management module is further configured to transmit the airline recovery scheduling solution to the airline scheduling module.

15. The airline operations system of any preceding clause, wherein the disruption management module is further configured to: identify all of the one or more uncovered flights from each associated crew recovery solution; obtain a delay value associated with each of the one or more uncovered flights; increment the delay value of each of the one or more uncovered flights by a predetermined increment value; and generate a recommendation to delay of each of the one or more uncovered flight with an incremented delay value for each of the one or more uncovered flights along with a request for a subsequent airline recovery scheduling solution.

16. The airline operations system of any preceding clause, wherein the disruption management module is further configured to: identify the one or more uncovered flight of a current crew recovery solution; generate a list of the one or more reserve and standby crews; assign the one or more reserve and standby crews to the one or more uncovered flights; and generate a recommendation to delay each of one or more previously uncovered flights assigned with the one or more reserve and standby crews along with a request for a subsequent airline recovery scheduling solution.

17. The airline operations system of any preceding clause, wherein the disruption management module is further configured to: generate a list of deadhead flights; determine whether each of the one or more reserve and standby crews can be assigned with deadheading to an origin station of the one or more uncovered flights; determine whether each of the one or more reserve and standby crews can be assigned without deadheading to the origin station of the one or more uncovered flights; determine if any of the one or more reserve and standby crews cannot be assigned with or without deadheading to the origin station of the one or more uncovered flights; assign the one or more reserve and standby crews that can be assigned to the one or more uncovered flights with or without deadheading to the origin station of the one or more uncovered flights; and generate the request for a subsequent airline recovery scheduling solution using a recommendation to delay any of the one or more uncovered flights assigned with the one or more reserve and standby crews.

18. The airline operations system of any preceding clause, wherein the disruption management module is further configured to generate a recommendation to cancel any of the one or more uncovered flights not assigned with any of the one or more reserve and standby crews.

19. The airline operations system of any preceding clause, wherein the disruption management module is further configured to generate at least one or more modeling scenarios to search for the best recovery solution in order to compute the recommendation of delaying or cancelling the one or more uncovered flights based on a minimal cost collection of flight delay costs, flight cancellation costs, and deadheading costs.

20. The airline operation system of any preceding clause, wherein generating the at least one modeling scenarios comprises searching for the best recovery solution with a lowest amount of cancellations and a minimum amount of delayed flights.

What is claimed is:

1. A method for generating an airline recovery scheduling solution in response to an airline scheduling disruption, the method comprising;
receiving, by a processing device, an airline recovery scheduling solution request to modify an original airline schedule operations solution based on one or more disruptive events associated with one or more airline flights, wherein the one or more disruptive events causes the airline scheduling disruption;
computing, by the processing device, an initial flight recovery solution, based on the one or more disruptive events, to reschedule or cancel one or more disrupted flights or ferry aircrafts between locations using a mixed integer linear program solver to minimize a collection of flight delay costs, flight cancellation costs, and ferry aircraft costs;
generating, by the processing device, an initial crew recovery solution using the initial flight recovery solution by assigning one or more flight crews to one or more rescheduled disrupted flights, wherein the initial crew recovery solution includes one or more covered flights and one or more uncovered flights;
identifying, by the processing device, one or more uncovered flights of the initial crew recovery solution;
generating, by the processing device, a list of one or more reserve and standby crews;

assigning, by the processing device, a subset of the one or more reserve and standby crews to the one or more uncovered flights of the initial crew recovery solution;

proceeding, starting with the initial flight recovery solution and the initial crew recovery solution, to compute, in an iterative manner, until a predetermined number of iterations have occurred:
  a first updated flight recovery solution to reschedule or cancel one or more flights of the initial flight recovery solution to reduce the number of uncovered flights of the initial crew recovery solution;
  a second updated flight recovery solution to reschedule or cancel one or more flights of the first updated flight recovery solution or ferry aircrafts between locations using the mixed integer linear program solver to minimize the collection of flight delay costs, flight cancellation costs, and ferry aircraft costs;
  a first updated crew recovery solution by assigning one or more flight crews to one or more flights of the second updated flight recovery solution; and
  a second updated crew recovery solution by assigning one or more of the reserve and standby crews to one or more uncovered flights of the second updated recovery solution;

after the predetermined number of iterations have occurred, generating, by the processing device, a passenger recovery solution based on the second updated flight recovery solution and the second updated crew recovery solution generated during the last iteration, and re-assigning one or more disrupted passengers to the one or more rescheduled disrupted flights;

configuring, by the processing device, the airline recovery scheduling solution using the second updated flight recovery solution and the second updated crew recovery solution generated during the last iteration, and the passenger recovery solution; and transmitting the airline recovery scheduling solution to one or more airports with the one or more disrupted flights.

2. The method according to claim 1, further comprising proceeding in the iterative manner to generate at least one or more modeling scenarios to compute the first updated flight recovery solution.

3. The method according to claim 1, further comprising proceeding in the iterative manner to:
  identify, by the processing device, all of the one or more uncovered flights of the first updated crew recovery solution;
  obtain, by the processing device, a delay value associated with each of the one or more uncovered flights;
  increment, by the processing device, the delay value of each of the one or more uncovered flights by a predetermined increment value; and
  generate, by the processing device, one or more recommendations to delay the one or more uncovered flights with an incremented delay value for each of the one or more uncovered flights along with a request for a subsequent airline recovery scheduling solution.

4. The method according to claim 1, further comprising proceeding in the iterative manner to:
  generate a list of deadhead flights;
  determine whether each of the one or more reserve and standby crews can be assigned with deadheading to an origin station of the one or more uncovered flights;
  determine whether each of the one or more reserve and standby crews can be assigned without deadheading to the origin station of the one or more uncovered flights;
  determine if any of the one or more reserve and standby crews cannot be assigned with or without deadheading to the origin station of the one or more uncovered flights;
  assign the one or more reserve and standby crews that can be assigned to the one or more uncovered flights with or without deadheading to the origin station of the one or more uncovered flights; and
  generate, by the processing device, a request for a subsequent airline recovery scheduling solution using the one or more recommendations to delay any of the one or more uncovered flights assigned with the one or more reserve and standby crews.

5. The method according to claim 4, further comprising proceeding in the iterative manner to cancel at least one of the one or more uncovered flights not assigned with any of the one or more reserve and standby crews.

6. The method according to claim 1, further comprising proceeding in the iterative manner to generate one or more modeling scenarios to compute one or more recommendation to delay or cancel the one or more uncovered flights based on a minimal cost collection of flight delay costs, flight cancellation costs, and deadheading costs.

7. An apparatus comprising a processor configured to:
  receive a request for an airline recovery scheduling solution to modify an original airline schedule operations solutions based on one or more disruptive events associated with one or more airline flights, wherein the one or more disruptive events causes the airline scheduling disruption;
  compute an initial flight recovery solution, based on the one or more disruptive events, to reschedule or cancel one or more disrupted flights or ferry aircrafts between locations using a mixed integer linear program solver to minimize a collection of flight delay costs, flight cancellation costs, and ferry aircraft costs;
  generate an initial crew recovery solution using the initial flight recovery solution by assigning one or more flight crews to one or more rescheduled disrupted flights, wherein the initial crew recovery solution includes one or more covered flights and one or more uncovered flights;
  identify one or more uncovered flights of the initial crew recovery solution;
  generate a list of one or more reserve and standby crews;
  assign a subset of the one or more reserve and standby crews to the one or more uncovered flights of the initial crew recovery solution;
  proceed, starting with the initial flight recovery solution and the initial crew recovery solution, to compute, in an iterative manner, until a predetermined number of iterations have occurred:
    a first updated flight recovery solution to reschedule or cancel one or more flights of the initial flight recovery solution to reduce the number of uncovered flights of the initial crew recovery solution;
    a second updated flight recovery solution to reschedule or cancel one or more flights of the first updated flight recovery solution or ferry aircrafts between locations using the mixed integer linear program solver to minimize the collection of flight delay costs, flight cancellation costs, and ferry aircraft costs;

a first updated crew recovery solution by assigning one or more flight crews to one or more flights of the second updated flight recovery solution; and a second updated crew recovery solution by assigning one or more of the reserve and standby crews to one or more uncovered flights of the second updated recovery solution;

after the predetermined number of iterations have occurred, generate a passenger recovery solution based on the second updated flight recovery solution and the second updated crew recovery solution generated during the last iteration, and re-assign one or more disrupted passengers to the one or more rescheduled disrupted flights; and transmit the airline recovery scheduling solution to one or more airports with the one or more disrupted flights.

8. The apparatus according to claim 7, wherein the processor is further configured to proceed in the iterative manner to:

identify all of the one or more uncovered flights of the first updated current crew recovery solution;

obtain a delay value associated with each of the one or more uncovered flights;

increment the delay value of each of the one or more uncovered flights by a predetermined increment value; and generate a recommendation to delay of each of the one or more uncovered flight with an incremented delay value for each of the one or more uncovered flights along with a request for a subsequent airline recovery scheduling solution.

9. The apparatus according to claim 7, wherein the processor is further configured to proceed in the iterative manner to:

generate a list of deadhead flights;

determine whether each of the one or more reserve and standby crews can be assigned with deadheading to an origin station of the one or more uncovered flights;

determine whether each of the one or more reserve and standby crews can be assigned without deadheading to the origin station of the one or more uncovered flights;

determine if any of the one or more reserve and standby crews cannot be assigned with or without deadheading to the origin station of the one or more uncovered flights;

assign the one or more reserve and standby crews that can be assigned to the one or more uncovered flights with or without deadheading to the origin station of the one or more uncovered flights; and generate a request for a subsequent airline recovery scheduling solution using a recommendation to delay any of the one or more uncovered flights assigned with the one or more reserve and standby crews.

10. The apparatus according to claim 9, wherein the processor is further configured to generate at least one or more modeling scenarios to compute the recommendation to delay or cancel the one or more uncovered flights based on a minimal cost collection of flight delay costs, flight cancellation costs, and deadheading costs.

11. The apparatus according to claim 7, wherein the processor is further configured to proceed in the iterative manner to cancel any of the one or more uncovered flights not assigned with any of the one or more reserve and standby crews.

\* \* \* \* \*